Sept. 23, 1924.
L. W. EGGLESTON
REGULATOR
Filed Feb. 4, 1921
1,509,669
2 Sheets-Sheet 1
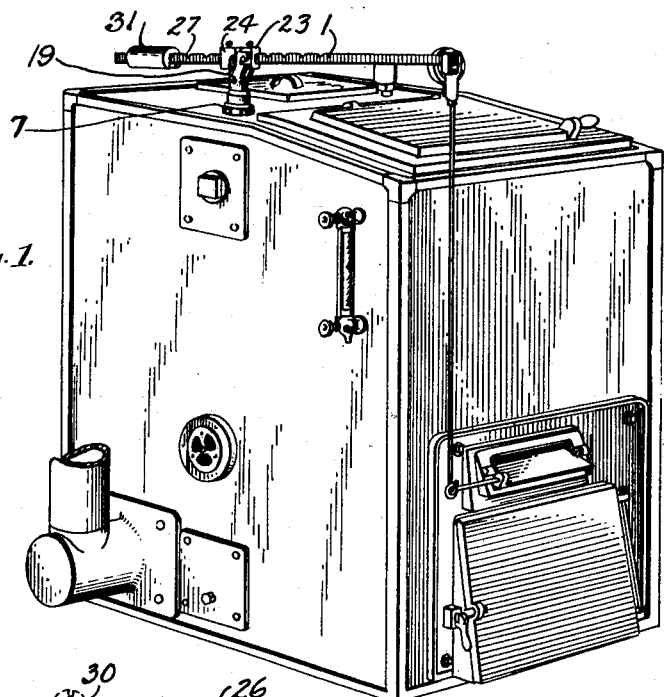
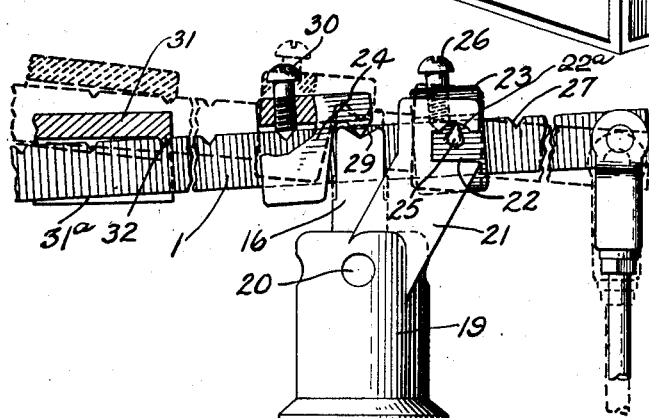
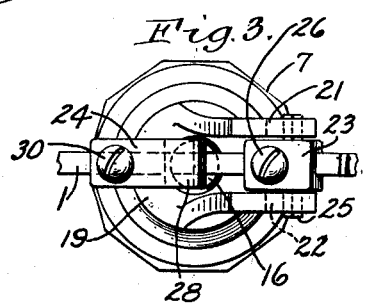
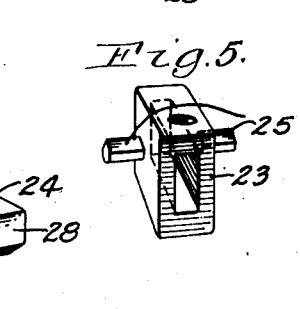
Inventor
LEWIS W. EGGLESTON
by Gifford Bull
his Attorneys Sept. 23, 1924.
L. W. EGGLESTON
REGULATOR
Filed Feb. 4, 1921
1,509,669
2 Sheets-Sheet 2
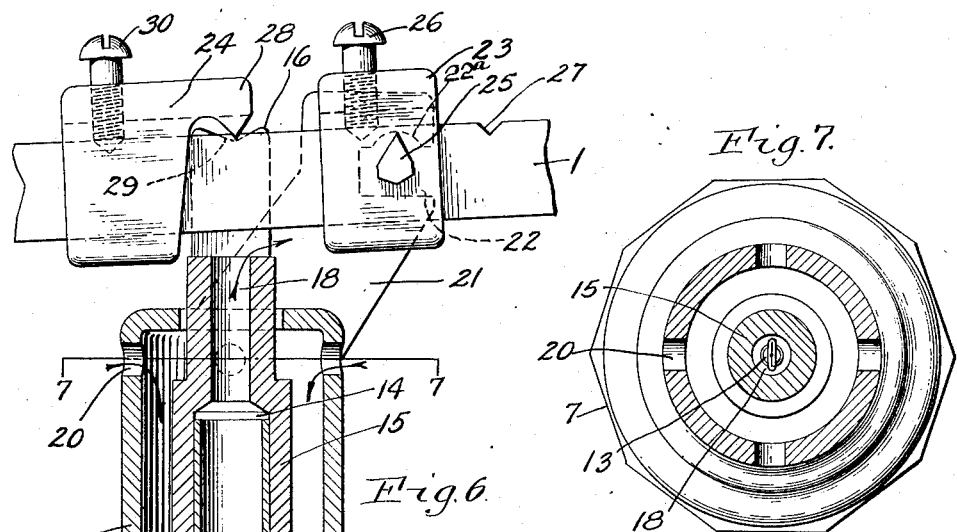
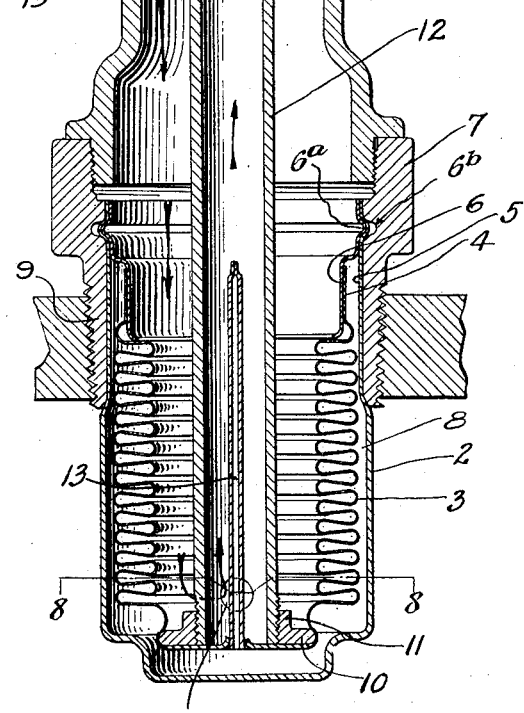
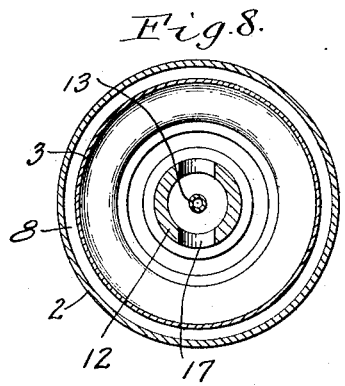
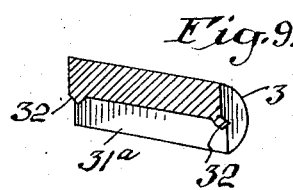
Inventor
LEWIS W. EGGLESTON
by Gifford & Bull
his Attorneys Patented Sept. 23, 1924.

1,509,669

UNITED STATES PATENT OFFICE.

LEWIS W. EGGLESTON, OF BUFFALO, NEW YORK, ASSIGNOR TO AMERICAN RADIATOR COMPANY, OF CHICAGO, ILLINOIS, A CORPORATION OF NEW JERSEY.

REGULATOR.

Application filed February 4, 1921. Serial No. 442,533.

*To all whom it may concern:*

Be it known that I, LEWIS W. EGGLESTON, a citizen of the United States, residing at Buffalo, in the county of Erie and State of New York, have invented new and useful Improvements in Regulators, of which the following is a full, clear, concise, and exact description, reference being had to the accompanying drawing, forming a part of this specification.

My invention relates to improvements in regulators for controlling the movement of different apparatus such, for instance, as the dampers of hot water boilers or the like.

The invention consists in the construction and improvements to be more fully described hereinafter and the novelty of which will be particularly pointed out and distinctly claimed.

For the purpose of disclosing my invention I have illustrated a preferred embodiment thereof in the enclosed drawings, in which:

Figure 1 is a perspective view of a hot water boiler showing one application of my invention;

Fig. 2 is an enlarged side elevation of one embodiment of my invention;

Fig. 3 is a plan view of one embodiment of my invention;

Fig. 4 and Fig. 5 are perspective views of the rocker arm saddles;

Fig. 6 is a longitudinal sectional view of the devices illustrated in view 2;

Fig. 7 is a sectional view taken on the line 7—7 of Fig. 6; and

Fig. 8 is a sectional view taken on the line 8—8 of Fig. 6.

Fig. 9 is a sectional view of a balancing weight.

In the embodiment of the invention illustrated, I provide for operating a rocking lever 1, which may be, for example, adapted to be connected with the dampers or fuel supply of a furnace, by a thermosensitive device which comprises a tubular casing 2 having a closed bottom and an open end. This tubular casing has arranged therein an expansible-collapsible member 3, likewise having a closed bottom and an open end and having its intermediate portion corrugated to render said member 3 longitudinally expansible and collapsible. The expansible-collapsible member 3 is of smaller diameter than the casing 2 and at its top the uncorrugated or cylindrical wall 4 of its open end is secured to an annular supporting ring 6, which together with the wall 5 of the casing 2 is expanded as at $6^a$ into an annular interior recess $6^b$ formed in the inner periphery of a supporting body 7. The supporting ring 6 is preferably generally cylindrical in form, and in the present embodiment is sleeved within the cylindrical wall 4 of the open end of the corrugated cylinder, said member 6 being of such length as to project beyond the open end of the cylinder 3, as clearly shown in Fig. 6 of the drawing. Suitable solder is used preferably between the walls 4 and 6 of the expansible-collapsible member, and between the wall 6 and the wall 5 of the casing 2 to insure a gas tight joint between the walls of the expansible-collapsible member and the casing. There is thus formed, between the expansible-collapsible member and the casing, a chamber 8 adapted to be charged with volatile liquid. The support or body portion 7 is provided with an elongated neck 9 exteriorly screw-threaded by which the apparatus may be secured in position with the thermosensitive member immersed in the liquid the temperature of which is to be controlled.

The bottom or closed end of the expansible-collapsible member 3 has secured therein, by corrugating the metal over the rounded edges thereof, a reinforcing ring 10 having a central annular boss 11 internally screw-threaded to receive the lower end of a hollow operating stem section 12.

For the purpose of charging the chamber of the thermosensitive device with volatile liquid, the closed end of the expansible-collapsible member is provided with a hollow stem 13 communicating through the bottom closed end of the expansible-collapsible member with the volatile liquid containing chamber 8. This stem 13 extends upwardly to within at least a short distance of the top or open end of the expansible-collapsible member, whereby after the thermosensitive device has been formed by assembling the casing 2 and the expansible-collapsible member 3, the chamber may be charged through this stem and the upper end of the stem pinched together and sealed by solder. The hollow operating stem section 12, the lower end of which is screw-threaded to fit into the annular screw-threaded ring 10, passes over this filling stem and protects the same against mechanical injury. At its upper end the stem section 12 is slightly reduced and fits in a socket 14 of a hollow stem extension 15, the upper end of which is bifurcated to provide a pair of arms 16.

The lower end of the operating stem is provided with air openings 17 and it will be seen that this hollow stem communicates with the atmosphere at its top through the opening 18 in the upper portion of the stem extension 15.

Secured over the stem extension and having an opening in the upper end thereof to permit the stem extension to project therethrough, is a housing or bonnet 19 the lower end of which is suitably exteriorly screw-threaded and adapted to engage an internally screw-threaded portion of the base or supporting member 7. This housing encloses the upper portion of the stem and the swivel connection between the two sections of the stem, and is provided at its upper end with a plurality of air circulating openings 20.

Extending upwardly from the housing or bonnet is a pair of supporting arms 21 having formed therein a pair of slots 22 the upper faces of which are arcuate as at 22ª. The damper operating lever 1 which is adapted to be connected to the dampers of a hot water boiler or with the fuel supply thereof extends between the bifurcated arms 16 of the stem and between the supporting arms 21 on the housing and is provided with a pair of adjustably mounted saddles 23 and 24. One of these saddles 23 has extending laterly therefrom a pair of fulcrum pins 25, the top of which are knife edged and which are adapted to fit in the slotted openings 22 in the supporting arms, the knife edge being arranged to bear on the arcuate walls 22ª of the openings. This slotted saddle 23 is held in position on the lever 1 by means of a set screw 26 threaded in the top of the saddle and adapted to engage in positioning notches 27 on the rocking lever. The second saddle 24, also is slotted to fit over the lever, and is provided with a longitudinally extending arm 28, knife edged on its lower face which knife edge is adapted to bear in a pair of V shaped recesses 29 formed in the upper edges of the arms 16. This saddle is likewise held in position by a set screw 30 threaded into the top of the saddle and having its lower end engaging in the positioning notches 27 in the rocker arm. For balancing the parts I provide a weight 31 slotted as at 31ª to fit over the rocking lever and adjustable thereon, the top face of the slot 31ª is provided with a pair of spaced projections 32 (as shown in Fig. 9) arranged to engage in the notches 27 and these projections are so spaced with relation to the notches on the lever that only one projection engages in a notch at a time to permit a nice adjustment of the weight along the lever.

The operation of the device, as used for example, for controlling the dampers of a hot water boiler is obvious. The device is mounted on the boiler with the thermosensitive member projecting into the water of the boiler. One end of the rocking lever 1 is connected with the dampers of the boiler. As the temperature of the water in the boiler rises above a predetermined point the heat of the water will expand the volatile liquid contained in the thermosensitive member which creating pressure causes the expansible-collapsible member 3 to rise, rocking the lever 1 to open the dampers of the boiler and check the fire.

In the event the temperature of the water in the boiler falls below a predetermined point the expanded volatile liquid in the thermosensitive device will become cooled thereby condensing and permitting the lower end of the expansible-collapsible member to drop carrying with it the operating stem, thereby permitting the rocker arm to move in the opposite direction to close the dampers of the boiler.

By the provision of the air circulating openings 17 and 18 in the operating stem, and openings 20 in the housing, a current of air is caused to circulate in the expansible-collapsible member 3. The air is caused to enter the opening 20 in the top of the housing whence, and due to the fact that it is cool, it tends to drop into the interior of the expansible-collapsible member 3 where being heated it passes through the openings 17 into the stem 12 and rises through the said stem and its extension 15 passing out through the opening 18. A circulation of air is thus created which tends to chill or cool the expansible-collapsible member 3 and through the expansible-collapsible member the volatile liquid in the expansion chamber 8. This circulation of cool air within the expansible-collapsible member assists in causing a quick response to a drop in temperature of the water in the boiler to be controlled. The cooling action of the water on the expanded gases in the chamber 8, which cooling action tends to condense the gases, is assisted by the air circulation so that the gases will be condensed rapidly and the rocking lever 1 moved to open the dampers or increase the fuel supply of the boiler quickly. Due to the cooling action there is an accelerated movement of the rocking lever so that the dampers of the boiler are opened with a very slight drop in the temperature of the boiler, and the temperature of the water of the boiler is therefore prevented from dropping below the predetermined point.

In the construction above described I have shown a device which is extremely sensitive to variations in temperature and which is adapted to act promptly and rapidly to prevent any wide fluctuation in the temperature of a hot water boiler.

The manner of mounting the lever 1 and the operating connections thereof is not claimed herein but is the subject matter of a separate application filed under even date herewith and bearing Serial No. 442,535.

While I have described my device in connection with a hot water boiler and as controlling the dampers of the hot water boiler, it is obvious that the device may be used in various other places and also obvious that instead of controlling the dampers of a boiler it may control the fuel supply of a boiler, such, for instance, of controlling the valve of a gas supply to the boiler.

It will also be understood that while I have shown one embodiment of my invention, the invention may be embodied in various forms and the structure illustrated may be modified without departing from the spirit of the invention.

Having thus described my invention, what I claim as new and desire to secure by Letters Patent is:

1. In a device of the character described, a support, a thermosensitive member comprising outer and inner concentric cylinders spaced from each other, the inner cylinder being corrugated to permit longitudinal expansion and contraction, said cylinders being each closed at one end, a separate annular member having one edge portion connected to the inner cylinder, and means for connecting the other edge portion of said annular member to the outer cylinder and for connecting said member and outer cylinder to said support.

2. In a device of the character described, a support having an internal annular recess, a thermosensitive member comprising outer and inner concentric cylinders spaced from each other, the inner cylinder being corrugated to permit longitudinal expansion and contraction, said cylinders being closed at one end, and a separate annular member connecting the cylinders at their opposite ends to form a closed chamber between the cylinders, said member and outer cylinder being expanded into said recess whereby said cylinders are connected to said support.

3. A thermosensitive member comprising a pair of telescoped cylinders each having one end closed, the inner cylinder having its wall corrugated to permit the same to expand and collapse, an annular support, means for securing said cylinders at their open ends together and within said annular support, and a hollow filling stem communicating with the chamber formed between said cylinders, said stem being arranged within the inner cylinder and extending upwardly from the closed end thereof.

4. The combination of an annular support, a pair of telescoped spaced apart cylinders, each having one end closed and its other end open, means for annularly securing said cylinders together, and to said support, a hollow filling stem communicating through the bottom of said inner cylinder with the chamber formed between said cylinders and arranged within said inner cylinder and extending from the bottom thereof, and a hollow operating stem surrounding said filling stem and connected operatively to the closed end of the inner cylinder.

5. The combination of an annular support, a thermosensitive member comprising a pair of spaced apart telescoped cylinders, the inner cylinder having its walls corrugated to permit the same to expand and collapse and each cylinder having one end closed, means for annularly securing the other ends of said cylinders together and to said support, a bonnet secured on said support in longitudinal alinement with said cylinders, an operating member, a hollow stem secured at its lower end to the closed end of said corrugated cylinder and having its upper end operably connected with said operating member, and means for causing circulation of air through said bonnet, corrugated cylinder and stem.

6. In a regulator, the combination of an expansible-collapsible member subjected to fluctuations in pressure and arranged to have the pressure exteriorly applied, an operating stem arranged in said member, and means including a passage through said stem for causing a circulation of air interiorly of said member and in contact therewith.

7. In a regulator, the combination of an expansible-collapsible member subjected to fluctuations in pressure and arranged to have the pressure exteriorly applied, a closure for the open end of said member and having an air circulating opening therein, a hollow operating stem arranged within said member, and having operative engagement with the bottom of said member and having an air circulating opening therein.

8. In a regulator, the combination of an expansible-collapsible member subjected to fluctuations in pressure and arranged to have the pressure exteriorly applied, a closure for the open end of said member and having an air circulating opening therein, a hollow operating stem arranged within said member, and having operative engagement with the bottom of said member and having at its lower end an air circulating opening.

9. In a regulator, the combination of an annular support, a thermosensitive member comprising outer and inner concentric cylinders spaced from each other, the inner cylinder being corrugated to permit longitudinal expansion and contraction, said clyinders being closed at one end, means annularly connecting the cylinders at their opposite ends to form a closed chamber between the same, means whereby said last-named means connects both said cylinders with said support, a closure member on the support and closing the internal chamber of the inner cylinder, a power-transmitting member connected operatively to the closed end of the inner cylinder and located in the internal chamber thereof, and means for circulating a cooling medium through said internal chamber and power-transmitting member.

10. In a regulator, the combination of an annular support, a thermosensitive member comprising inner and outer concentric cylinders spaced from each other, the inner cylinder being corrugated to permit longitudinal expansion and contraction, said cylinders being closed at one end, means connecting the cylinders at their opposite ends to form a closed chamber between the same, means for connecting said cylinders with said support, a bonnet member closing the inner cylinder, a hollow member located in the bonnet and corrugated cylinder and having one end in operative engagement with the closed end of the corrugated cylinder, the bonnet having an air opening, and the hollow member having an air opening communicating with the bore thereof at a point within the corrugated cylinder whereby air is caused to circulate through the bonnet, the interior of the corrugated cylinder and said hollow member.

11. In a regulator, the combination of a hollow cylinder corrugated to permit longitudinal expansion and contraction and arranged to be subjected to fluctuations in pressure exteriorly applied, said cylinder having one end closed by an end wall and the other end open, a hollow stem arranged within said cylinder and having operative engagement with said end wall, said stem having an air circulating opening communicating with the bore of said stem at a point within said cylinder.

12. In a regulator, the combination of an annular support, a thermosensitive member comprising outer and inner concentric cylinders spaced from each other, the inner cylinder being corrugated to permit longitudinal expansion and contraction, said cylinders being closed at one end, means annularly connecting the cylinders at the opposite ends to form a closed chamber between the same, means for connecting said cylinders with said support, a closure member closing the internal chamber of the inner cylinder, a power-transmitting member having operative engagement with the closed end of the inner cylinder and located in the internal chamber thereof, and means for circulating a cooling medium through said internal chamber and power-transmitting member.

In witness whereof, I have hereunto subscribed my name in the presence of two witnesses.

LEWIS W. EGGLESTON.

Witnesses:
F. MELSON,
P. E. STOKES.